United States Patent [19]

Katsumata et al.

[11] 4,387,571
[45] Jun. 14, 1983

[54] KNOCK CONTROL SYSTEM AND METHOD FOR TURBOSUPERCHARGER INSTALLED ENGINES

[75] Inventors: Masaaki Katsumata, Yokohama; Kenji Yoneda, Fujisawa, both of Japan

[73] Assignee: Nissan Motor Company, Limited, Kanagawa, Japan

[21] Appl. No.: 173,433

[22] Filed: Jul. 29, 1980

[30] Foreign Application Priority Data

Jul. 30, 1979 [JP] Japan .................................. 54-96934

[51] Int. Cl.³ ............................................. F02B 37/12
[52] U.S. Cl. ........................................ 60/602; 60/611
[58] Field of Search ................. 60/600, 601, 602, 603, 60/611; 123/146.5 R, 425, 435, 564; 73/35

[56] References Cited

U.S. PATENT DOCUMENTS

| | | | |
|---|---|---|---|
| 3,822,583 | 7/1974 | Keller et al. | 73/35 |
| 4,012,942 | 3/1977 | Harned | 73/35 |
| 4,153,020 | 5/1979 | King et al. | |
| 4,261,313 | 4/1981 | Iwata et al. | 123/425 |
| 4,289,102 | 9/1981 | Katsumata et al. | 123/425 |
| 4,290,398 | 9/1981 | Hattori et al. | 123/425 |
| 4,322,948 | 4/1982 | Emmenthal et al. | 60/611 X |

FOREIGN PATENT DOCUMENTS 1519108 7/1978 United Kingdom .

*Primary Examiner*—Michael Koczo
*Attorney, Agent, or Firm*—Lowe, King, Price & Becker

[57] ABSTRACT

A knock control system and method for use in an internal combustion engine equipped with a supercharger for applying supercharge to the engine comprise detecting the frequency of occurrence of knock in the engine, and varying the degree of supercharge applied to the engine in accordance with the detected frequency of occurrence of knock.

9 Claims, 4 Drawing Figures

KNOCK CONTROL SYSTEM AND METHOD FOR TURBOSUPERCHARGER INSTALLED ENGINES

BACKGROUND OF THE INVENTION

1. Field of the Invention

This invention relates to a knock control system and method for use in an internal combustion engine equipped with a turbosupercharger and, more particularly, to such a knock control system for controlling the degree of supercharge applied to the engine in accordance with detected knock intensity.

2. Description of the Prior Art

In order to improve internal combustion engine efficiency and performance, a turbosupercharger has been employed to artifically increase the amount of air supplied to the cylinders. With the air pressure rising, however, the air temperature increases in the cylinders, increasing the tendency to knock. Continuous heavy knock may be a cause of abnormal vibrations and local overheat subjecting the engine to abnormal wear and failure. This results in a degradation of engine efficiency and performance.

In order to eliminate the above disadvantages, it is conventional practice to suppress knock by lowering the engine compression ratio. However, this leads to limited engine output and fuel economy and high engine output can be achieved where knock is allowed to some extent.

SUMMARY OF THE INVENTION

It is therefore an object of the present invention to provide a knock control system and method for use in an internal combustion engine equipped with a supercharger which can control the degree of supercharge applied to the engine in accordance with knock intensity.

Another object of the present invention is to provide a knock control system and method of the character described which can control knock intensity within a suitable range allowing light knock leading to high engine efficiency and performance.

Still another object of the present invention is to provide a knock control system and method of the character described which can protect the engine from failure resulting from heavy knock.

BRIEF DESCRIPTION OF THE DRAWINGS

The present invention will be described in greater detail by reference to the following description taken in connection with the accompanying drawings, in which.

DESCRIPTION OF THE PREFERRED EMBODIMENTS

Figure 1:
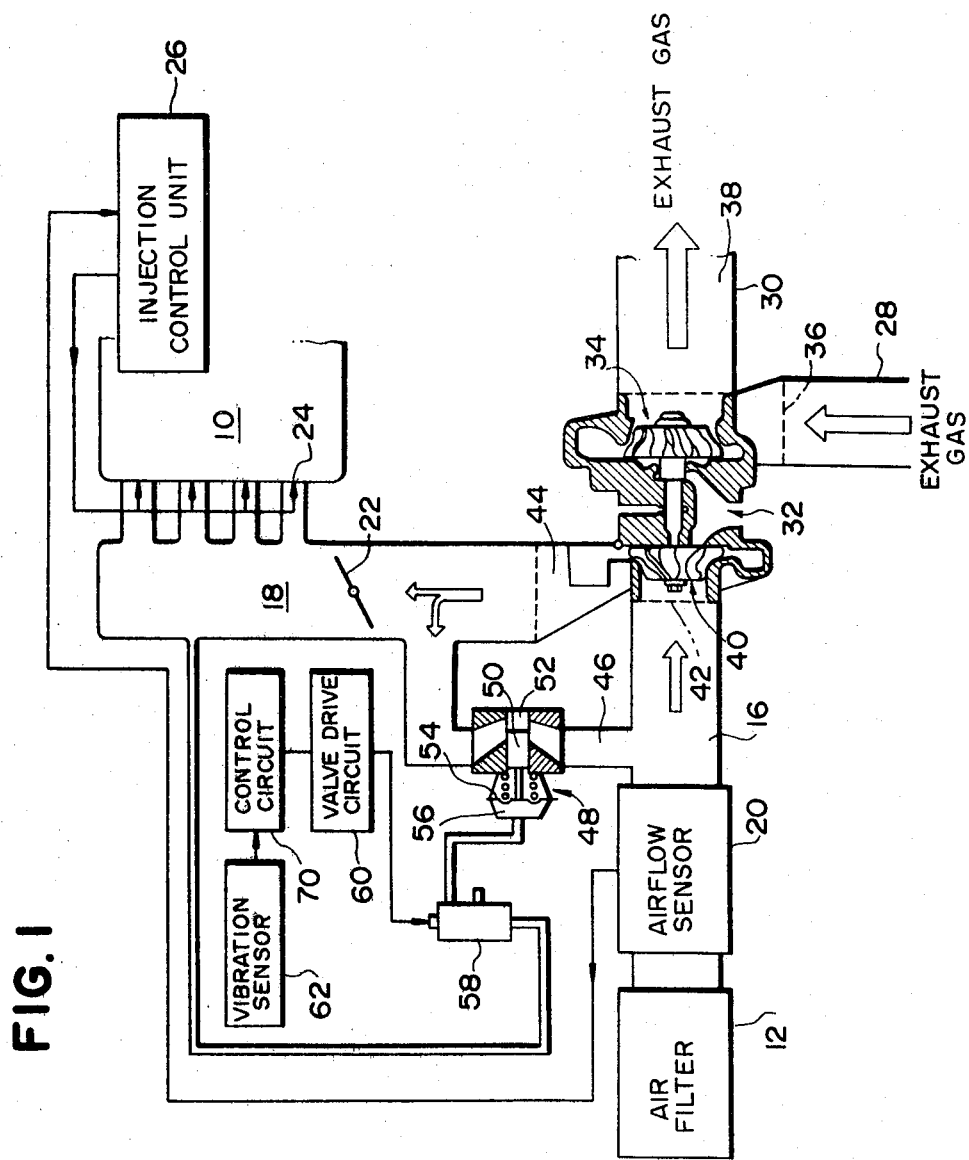
FIG. 1 is a schematic view showing one embodiment of a knock control system made in accordance with the present invention.

Referring first to FIG. 1 of the drawings, the reference numeral 10 designates an internal combustion engine which may be a petrol or diesel engine. Air to the engine 10 is supplied through an air filter 12 to an induction passage 16 and hence through an intake manifold 18 to the combustion chambers of the engine 10. The induction passage 16 has therein an airflow sensor 20 near its entrance and a throttle valve 22 near its downstream end. Fuel for the engine 10 is supplied through fuel injection valves 24 provided for the respective combustion chambers. The operation of the fuel injection valves 24 is controlled by an injection control unit 26 which provides thereto a fuel injection pulse signal corresponding to the amount of air through the airflow sensor 20. Exhaust gases from the engine 10 are discharged through an exhaust manifold 28 and an exhaust passage 30 to the atmosphere.

A turbosupercharger 32 is provided for supercharging air to the engine 10 by utilizing the flow of exhaust gases from the engine 10. The turbosupercharger 32 comprises a turbine 34 located in the exhaust passage 30 and driven by the flow of exhaust gases therethrough from its inlet 36 to its outlet 38. The turbosupercharger 32 also comprises a compressor 40 located in the induction passage 16. The compressor 40 is coaxially connected to the turbine 34 and driven by rotation thereof to raise the pressure of the air flowing from its inlet 42 to its outlet 44.

In accordance with the invention as exemplified in the illustrated embodiment, the compressor 40 is bridged by a return passage 46 which opens at its one end into the induction passage 16 downstream of the airflow sensor 20 and opens at the other end to the induction passage 16 upstream of the throttle valve 22. The return passage 46 has therein a pneumatic control valve 48 for controlling the amount of air flowing through the return passage 46. The control valve 48 has a valve member 50 movable transversely of the return passage 46 to define a throat 52, the area of whose opening varies as a function of the transverse position of the valve member 50. Movement of the valve member 50 is effected by a diaphragm 54 spread within a casing to form therewith two chambers on the opposite sides of the diaphragm 54. The working chamber 56 is communicated with the outlet of a three-way solenoid valve 58 which has an air inlet connected to atmospheric air and a vacuum inlet connected to a vacuum source such, for example, as the portion of the intake manifold 18 downstream of throttle 22. The throttle 22, positioned in the supercharge air flow path, tends to create a partial vacuum in the downstream portion of the manifold 18. The three-way solenoid valve 58 is operable between first and second positions. It provides communication between the air inlet and the outlet to introduce atmospheric pressure to the working chamber 56 so as to move the valve member 50 toward its closed position when taking the first position. In the second position, the three-way solenoid valve 58 establishes communication between the vacuum inlet and the outlet to introduce a vacuum to the working chamber 56, causing movement of the valve member 50 toward its open position.

That is, while the three-way solenoid valve 58 is held in the second position, the area of opening of the throat 52 is inversed to permit increased air flow through the return passage 46, whereby the degree of supercharge applied to the engine is reduced. To the contrary, while the three-way solenoid valve 58 is held in the first position, the amount of air flowing through the return passage 46 is reduced with an increased degree of supercharge.

The position of the three-way solenoid valve 58 is changed by the function of a valve drive circuit 60. A vibration sensor 62 is provided which is adapted to detect vibrations and provide a signal representative of detected vibrations. The vibration sensor 62 may be in the form of a resonance vibration sensor having a resonance frequency equal to that of knock occurring in the engine. The output of the vibration sensor 62 is coupled to a knock intensity detecting circuit 70 which controls the operation of the valve drive circuit 60 in accordance with detected knock intensity.

In view of the known fact that the tendency of occurrence of knock becomes lower with a smaller degree of supercharge applied to the engine, the knock intensity detecting circuit 70 controls, through the valve drive circuit 60, the three-way solenoid valve 58 such that the degree of supercharge can be reduced to a suitable level allowing light knock leading to high fuel economy and high engine output characteristics when the frequency of occurrence of knock is high. To the contrary, when no knock occurs or the frequency of occurrence of knock is low, the degree of supercharge is held to a level determined by the amount, pressure and temperature of exhaust gases from the engine so that high engine output characteristics and high fuel economy can be achieved.

In more detail, a pulse signal of a predetermined frequency and a pulse width corresponding to the frequency of occurrence of knock is applied to the three-way solenoid valve 58 which thereby changes its position in on-off fashion to control the transverse position of the valve member 50 so as to control the degree of supercharge applied to the engine in accordance with the frequency of occurrence of knock.

Figure 2:
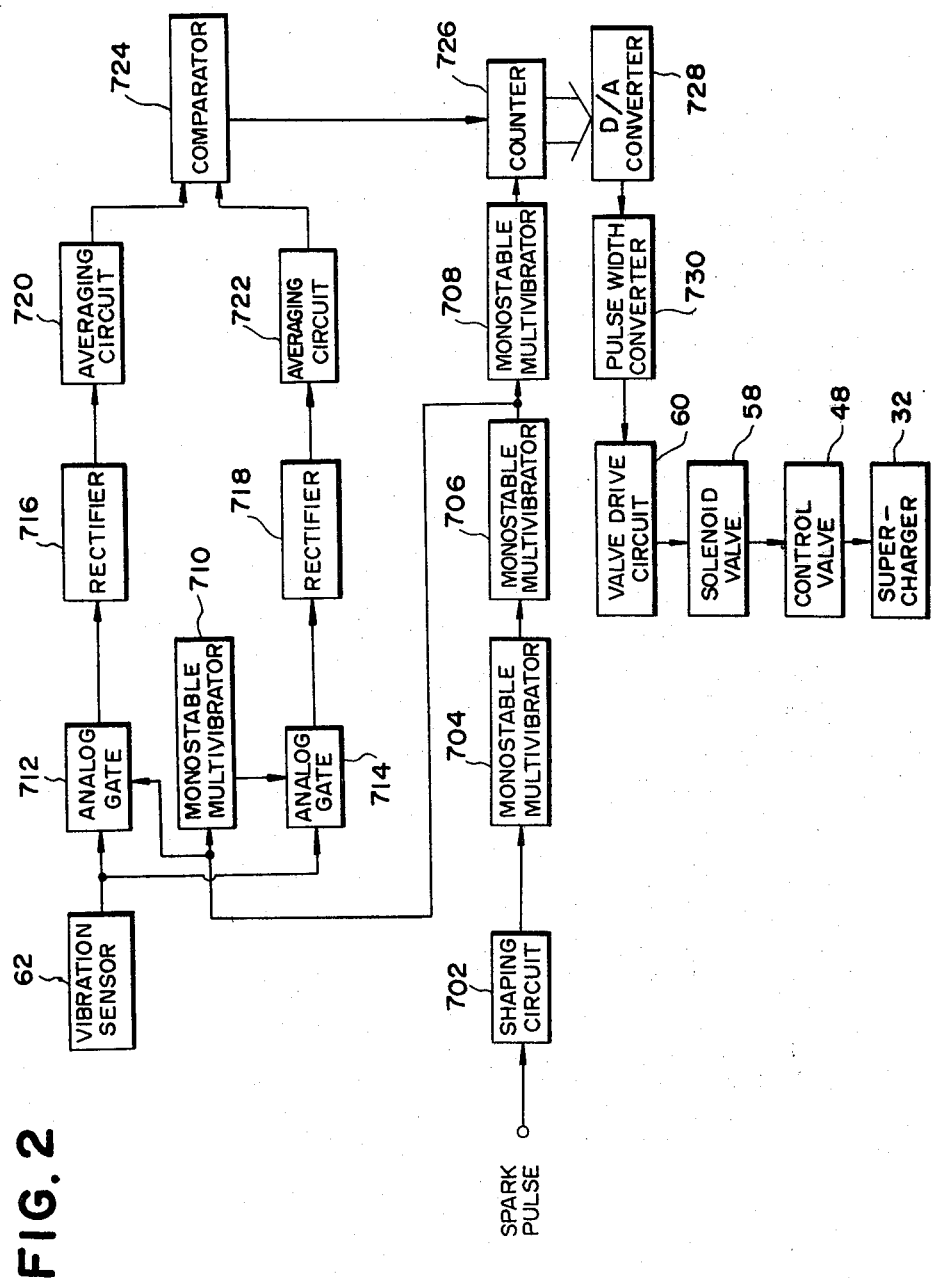
FIG. 2 is a block diagram showing the detail structure of the knock detecting circuit used in the system of FIG. 1.

The detailed structure of the knock control circuit 70 will be described with reference to FIG. 2 as well as the operation thereof in connection with the time chart of FIG. 3.

Figure 3:
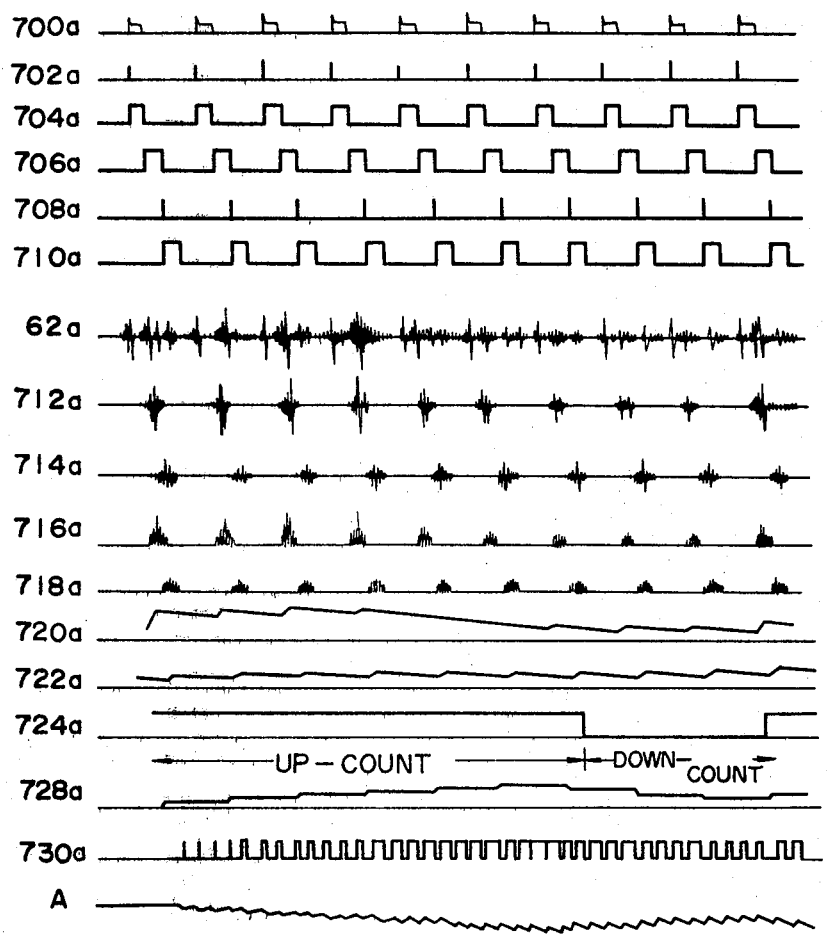
FIG. 3 is a timing chart used in explaining the operation of the knock detecting circuit of FIG. 2.

The knock intensity detecting circuit 70 includes a waveform shaping circuit 702 receiving a series of spark pulses, as shown in the waveform 700a of FIG. 3. The shaped pulse signal, as shown in the waveform 702a of FIG. 3, is applied as a trigger signal to a monostable multivibrator 704 which provides at its output a pulse signal of a predetermined pulse width, as shown in the waveform 704a of FIG. 3, in synchronism with generation of the spark pulses. The output of the monostable multivibrator 704 is applied to a monostable multivibrator 706 which is triggered by the trailing edge of each input pulse and generates at its output a pulse signal of a pulse width determined by the crank angle corresponding to the period during which knock occurs, as shown by the waveform 706a of FIG. 3. The output of the monostable multivibrator 706 is applied to a monostable multivibrator 708 which is triggered by the trailing edge of each input pulse, providing at its output a pulse signal, as shown in the waveform 708a of FIG. 3, of the frequency equal to that of the spark pulse signal.

The output of the monostable multivibrator 706 is applied to a monostable multivibrator 710 and also to an analog gate 712. The monostable multivibrator 710 is triggered by the trailing edge of each input pulse and provides at its output a pulse signal, as shown in the waveform 710a of FIG. 3, of a pulse width determined by the crank angle corresponding to the period during which no knock occurs. The analog gate 712 allows the output signal of the vibration sensor 62, as shown in the waveform 62a of FIG. 3, to pass therethrough to a rectifier circuit 716 in response to the output of the monostable multivibrator 706; i.e., only the period during which knock occurs. In other words, the analog gate 712 passes a signal indicative of vibrations which are caused by knock, as shown in the waveform 712a of FIG. 3, to the rectifier circuit 716. The analog gate 714 allows the output signal of the vibration sensor to pass therethrough to a rectifier circuit 718 in response to the output of the monostable multivibrator 710; i.e., only the period during which no knock occurs. In other words, the analog gate 714 passes a signal indicative of background noise which is not caused by knock, as shown in the waveform 714a of FIG. 3, to the rectifier circuit 718.

The rectifier circuit 716 rectifies the output of the analog gate 712 and provides at its output a positive or negative signal representing vibrations caused by knock, as shown in the waveform 716a of FIG. 3. The rectified signal is then applied to an averaging circuit 720 in which it is averaged, as shown in the waveform 720a of FIG. 3. The rectifier circuit 718 rectifies the output of the analog gate 714 and provides at its output a positive or negative signal representing background noise not caused by knock, as shown in the waveform 718a of FIG. 3. The rectified signal is applied to an averaging circuit 722 in which it is averaged, as shown in the waveform 722a of FIG. 3.

The averaged outputs from the averaging circuits 720 and 722 are applied to a comparator 724 which compares them for deciding the presence of knock. The comparator 724 provides a high output when knock occurs and the output of the averaging circuit 720 is equal to or higher than the output of the averaging circuit 722 and provides a low output when no knock occurs. The output of the comparator 724 is applied to an up-down counter 726 to which a pulse signal, as shown in the waveform 708a of FIG. 3, is also applied from the monostable multivibrator 708. The counter 726 counts the input pulses up in response to a high output of the comparator 724 and counts them down in response to a low output of the comparator 724. Thus, the content of the counter 726 represents the frequency of occurrence of knock. The content of the counter 726 is converted through a D/A converter 728 into a corresponding analog signal, as shown in the waveform 728a of FIG. 3, which in turn is applied to a pulse width modulator 730. The pulse width modulator 730 provides at its output a pulse signal, as shown in the waveform 730a of FIG. 3, of a predetermined frequency and a pulse width determined by the input signal. The pulse signal from the pulse width modulator 730 is applied to the valve drive circuit 60 in which it is amplified. The amplified signal is applied to the three-way solenoid valve 58 so as to determine the transverse position of the valve member 50 of the control valve 48; that is, the degree of supercharge applied to the engine, as shown in the waveform A of FIG. 3.

Assuming now that heavy knock continuously occurs, the counter 726 continuously counts input pulses up, causing application of a pulse signal of an increased pulse width to the solenoid valve 58, with an increased average time period during which the solenoid valve 58 provides communication between its vacuum inlet and outlet to introduce a vacuum to the working chamber 56 of the control valve 48. As a result, the valve member 50 moves toward its open position permitting increased air flow through the return passage 46. This reduces the supercharge degree and thus suppresses knock. To the contrary, if no knock occurs, the counter 726 continuously counts input pulses down, causing application of a pulse signal of reduced pulse width to the solenoid valve 58. As a result, the valve member 50 moves toward its closed position to reduce the amount of air flowing through the return passage 46 so that the supercharge degree increases to a level leading to an increased engine output. Consequently, the engine operation can be controlled within a suitable range allowing light knock leading to high fuel economy and high engine output characteristics.

Figure 4:
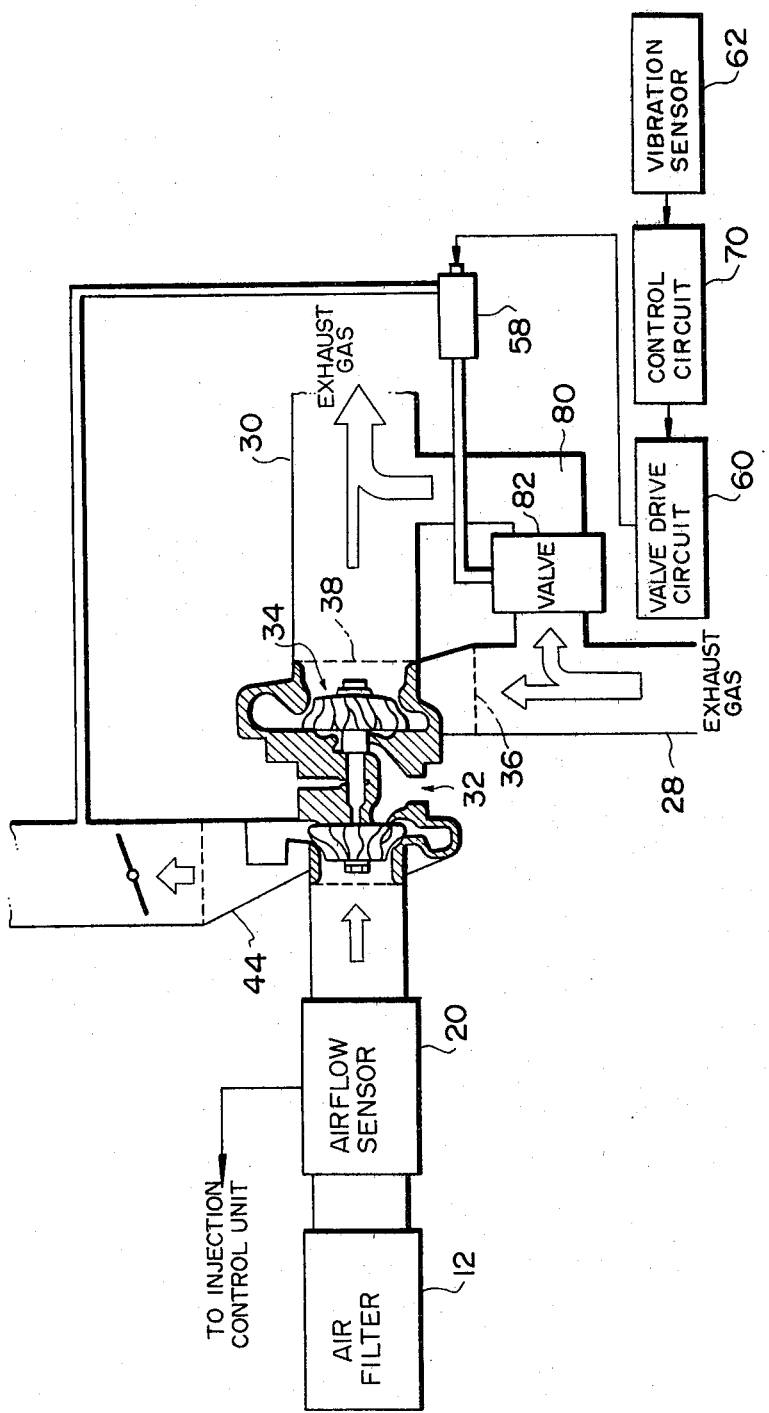
FIG. 4 is a schematic view showing an alternative embodiment of the present invention.

Referring to FIG. 4, there is illustrated an alternative embodiment of the present invention which differs from the first embodiment only in that the supercharge degree control unit is provided in the exhaust system rather than in the intake system. Parts in FIG. 4 which are like those in FIG. 1 have been given the same reference character.

In this embodiment, the turbine 34 is bypassed by a bypass passage 80 which opens at its one end into the outlet of the intake manifold 28 and openes at the other end to the exhaust passage 30. The bypass passage 80 has therein a pneumatic control valve 82 substantially similar in structure to the control valve 48 described in connection with the first embodiment for varying the area of opening of the bypass passage 80. The control valve 82 is controlled by the three-way solenoid valve 58 in the same manner as described in connection with the first embodiment.

For example, if the control valve 82 moves toward its open position to allow a part of exhaust gases to flow through the bypass passage 80, the amount of exhaust gases flowing through the turbine 34 is reduced, resulting in a reduction in the frequency of rotation of the turbine 34 and thus the compressor 40. As a result, the degree of supercharge applied to the engine is reduced.

The structure of the second embodiment can achieve the same effect as obtained with the first embodiment such as to control the degree of supercharge applied to the engine to a suitable level allowing light knock leading to high fuel economy and high engine output characteristics in accordance with the frequency of occurrence of knock.

Although the present invention has been described in connection with a fuel injection type internal combustion engine, it is to be noted that it could readily be applied to any carburetor type internal combustion engines. It should also be understood that the present invention is applicable to diesel engines as well as petrol engines.

In addition, the supercharge degree control unit may be of any type having an ability to control the degree of supercharge effected by a supercharger. Also, any knock intensity detecting unit may be used which can detect knock intensity. For example, a knock intensity detecting unit may be used which includes a vibration sensor having a resonance frequency higher than knock frequency, and a band pass filter adapted to allow the passage of a knock indicative signal only.

With the knock control system of the present invention, the degree of supercharge applied to an engine can be controlled, in accordance with detected knock intensity, to a suitable level allowing light knock. This is effective to maintain high fuel economy and engine output characteristics with holding the supercharging effect of a turbosupercharger at a suitable level. Accordingly, it is possible to protect the engine from local overheat and failure resulting from heavy knock.

While the present invention has been described in conjunction with specific embodiments thereof, it is evident that many alternatives, modifications and variations will be apparent to those skilled in the art. Accordingly, it is intended to embrace all alternatives, modifications and variations that fall within the spirit and broad scope of the appended claims.

What is claimed is:

1. A knock control system for use in an internal combustion engine equipped with a supercharger for applying supercharge to said engine, comprising:
   (a) first means for detecting the frequency of occurrence of knock in said engine;
   (b) second means for varying the degree of supercharge applied to said engine; and
   (c) third means for controlling said second means to vary the degree of supercharge in accordance with the detected frequency of occurrence of knock.

2. A knock control system according to claim 1, wherein said first means comprises detector means for detecting knock vibrations caused by knock occurring in said engine and background vibrations caused by other than knock, comparator means for providing a first signal when the knock vibrations are larger than the background vibrations and a second signal when the knock vibrations are smaller than the background vibrations, counter means for counting reference pulses up in response to the first signal and for counting the reference pulses down in response to the second signal, and means for providing a signal corresponding to the content of said counter means.

3. A knock control system according to claim 2, wherein said detector means comprises a vibration sensor for providing a signal indicative of vibrations occurring in said engine, first and second analog gates coupled to said vibration sensor, control means for allowing said first analog gate to pass the vibration indicative signal only during a time period where knock occurs and for allowing said second analog gate to pass the vibration indicative signal only during a time period when no knock occurs, first and second rectifier circuits for rectifying the signals from said first and second analog gates, respectively, and first and second averaging circuits for averaging the rectified signals from said first and second rectifier circuits, respectively.

4. A knock control system according to claim 3, wherein said control means comprises a first monostable multivibrator triggered by engine spark pulses to provide a pulse signal of a pulse width determined by the crank angle corresponding to the period during which knock occurs, a second monostable multivibrator triggered by the trailing edge of each pulse from said first monostable multivibrator to provide a pulse signal of a pulse width determined by the crank angle corresponding to the period when no knock occurs, said first analog gate responsive to the pulse signal from said first monostable multivibrator for allowing the passage of the vibration indicative signal, and said second analog gate responsive to the pulse signal from said second monostable multivibrator for allowing the passage of the vibration indicative signal.

5. A knock control system according to claim 3, wherein said vibration sensor is in the form of a resonance vibration sensor having a resonance frequency equal to that of knock occurring in said engine.

6. A knock control system according to claim 1, wherein said supercharger includes a turbine located in the exhaust passage of said engine, and a compressor located in the intake passage of said engine and drivingly connected to said turbine, and wherein said second means comprises a return passage opening into said intake passage at the opposite sides of said compressor, and valve means provided in said return passage for movement within said return passage to vary the area of opening of said return passage.

7. A knock control system according to claim 1, wherein said supercharger includes a turbine located in the exhaust passage of said engine, and a compressor located in the intake passage of said engine and drivingly connected to said turbine, and wherein said second means comprises a bypass passage opening into said exhaust passage at the opposite sides of said turbine, and valve means for movement within said bypass passage to vary the area of opening of said bypass passage.

8. A method for controlling knock in an internal combustion engine having a supercharger for applying supercharge to the engine, comprising the steps of detecting the frequency of occurrence of knock in the engine and varying the degree of supercharge applied to the engine in response to the detected frequency of occurrence of knock.

9. A knock control method according to claim 8, including detecting engine background vibrations caused by other than knock, determining when engine knock vibrations are larger than the background vibrations and in response controlling the degree of supercharge only in accordance with engine knock.

* * * * *